(12) United States Patent
Grundhöfer et al.

(10) Patent No.: US 11,368,657 B2
(45) Date of Patent: Jun. 21, 2022

(54) LIGHT FIELD BASED PROJECTOR CALIBRATION METHOD AND SYSTEM

(71) Applicant: Disney Enterprises, Inc., Burbank, CA (US)

(72) Inventors: Anselm Grundhöfer, Uster (CH); Daisuke Iwai, Osaka (JP)

(73) Assignee: DISNEY ENTERPRISES, INC., Burbank, CA (US)

( * ) Notice: Subject to any disclaimer, the term of this patent is extended or adjusted under 35 U.S.C. 154(b) by 483 days.

(21) Appl. No.: 15/719,383

(22) Filed: Sep. 28, 2017

(65) Prior Publication Data
US 2019/0098270 A1 Mar. 28, 2019

(51) Int. Cl.
| | | |
|---|---|---|
| *H04N 9/31* | (2006.01) | |
| *G06T 7/70* | (2017.01) | |
| *H04N 13/307* | (2018.01) | |
| *H04N 13/327* | (2018.01) | |
| *G01J 3/02* | (2006.01) | |
| *H04N 13/363* | (2018.01) | |
| *H04N 17/00* | (2006.01) | |
| *G01J 3/52* | (2006.01) | |
| *G01J 3/50* | (2006.01) | |

(52) U.S. Cl.
CPC ............ *H04N 9/3194* (2013.01); *G01J 3/027* (2013.01); *G01J 3/505* (2013.01); *G01J 3/524* (2013.01); *G06T 7/70* (2017.01); *H04N 9/3179* (2013.01); *H04N 13/307* (2018.05); *H04N 13/327* (2018.05); *H04N 13/363* (2018.05); *H04N 17/00* (2013.01); *G06T 2207/10052* (2013.01)

(58) Field of Classification Search
None
See application file for complete search history.

(56) References Cited

U.S. PATENT DOCUMENTS

| | | | |
|---|---|---|---|
| 5,803,570 A | * | 9/1998 | Chen ................... H04N 9/3185 348/745 |
| 2010/0123784 A1 | | 5/2010 | Ding et al. |
| 2012/0162385 A1 | * | 6/2012 | Park .................... H04N 13/254 348/47 |
| 2016/0173842 A1 | * | 6/2016 | De La Cruz ......... G03B 21/147 353/70 |
| 2017/0069056 A1 | * | 3/2017 | Sachs ................... G06T 3/0093 |
| 2017/0122725 A1 | * | 5/2017 | Yeoh .................... G09G 3/006 |

OTHER PUBLICATIONS

European Extended Search Report dated Feb. 28, 2019 for Application No. 18196637.5, 13 pages.
Tehrani et al., "A Practical Method for Fully Automatic Intrinsic Camera Calibration Using Directionally Encoded Light," IEEE Conference on Computer Vision and Pattern Recognition Proceedings, IEEE Computer Society, Jul. 21, 2017, pp. 125-133.

* cited by examiner

*Primary Examiner* — Samira Monshi
(74) *Attorney, Agent, or Firm* — Dorsey & Whitney LLP

(57) ABSTRACT

The present disclosure relates to a method for calibrating a projector. In one example, the method includes receiving by a processing element light field data corresponding to a calibration image projected by a projector and captured by a light field capturing device, and modeling by a processing element one or more intrinsic properties of the projector using the light field data and the calibration image. The calibration image may be projected by the projector directly into the light field capturing device.

16 Claims, 3 Drawing Sheets

LIGHT FIELD BASED PROJECTOR CALIBRATION METHOD AND SYSTEM

TECHNICAL FIELD

The technology described herein relates generally to methods and systems for calibrating one or more projectors.

BACKGROUND

Image and/or video projectors may be used to project images onto a projection surface, such as onto a screen, a wall, or other surface. In some applications, projectors may be used to enhance, compliment, or otherwise augment objects on the projection surface to create a dynamic and enjoyable user experience, such as an amusement park attraction. For example, characters or objects may be projected on a surface to provide an immersive environment for an amusement park goer.

Image and/or video projectors may include a number of limitations. For instance, some projectors may have limited color gamut and brightness properties. In addition, the image filtering hardware/software and/or the lens configuration of some projectors may distort a projected image such that differences exist between the projected image appearing on the projection surface and the source image.

In these and other examples, the intrinsic calibration of projectors is often required for high quality projection mapping applications. The main goal of calibration is to estimate a model to accurately represent the optical system of the projector, including its field of view and optical axis, among others, as well as the non-linear distortion occurring due to its lens configuration.

Known calibration techniques, however, require significant user interaction, are time-intensive, and are often not very accurate. In addition, current projector calibration methods are closely related to standard camera calibration methods by treating the projector as an inverse of a camera and applying similar, adapted calibration methods to compute the projector's parameters, which may not accurately model the intrinsic properties of the projector. As such, there exists a need for a technique that can be used to more accurately calibrate projectors.

SUMMARY

One example of the present disclosure relates to a method of calibrating a projector. The method includes receiving by a processing element light field data corresponding to a calibration image captured by a light field capturing device. The calibration image may be projected by a projector directly into the light field capturing device. The method also includes modeling by a processing element one or more intrinsic properties of the projector using the light field data and the calibration image.

Another example of the present disclosure includes a system for calibrating a projector. The system includes a projector configured to project a calibration image, a light field capturing device configured to capture at least a portion of the calibration image projected by the projector, and a processing element in communication with the light field capturing device and configured to model one or more intrinsic properties of the projector using light field data corresponding to the calibration image captured by the light field capturing device. The calibration image may be projected by the projector directly into the light field capturing device.

SPECIFICATION

The present disclosure is generally related to a system and method for calibrating a projector. The projector projects a calibration image or test pattern directly into a light field capturing device, such as a scanner that can sense directional light information (e.g., flatbed scanner with a directional light blocking layer), a light field camera, or other similar device capable of capturing the light field representation of a scene. The light field capturing device converts the captured scene into light field data corresponding to the captured calibration image or test pattern. The system includes one or more processing elements configured to receive the light field data. The one or more processing elements model one or more intrinsic properties of the projector using the light field data and the calibration image. For example, based on the captured information, such as the intensity of light from the projector as well as the direction that light rays are traveling from the projector to the light field capturing device, the one or more processing elements can model the type and degree of internal distortions induced by the projector during the projection process. More specifically, using the light field data and the calibration image or test pattern, the one or more processing elements can model the distortions to the projected image caused by the projector's lens, the projector's image filtering systems, or the like. Using the modeled intrinsic properties of the projector, the system can account for and/or otherwise alleviate the distortions intrinsic to the projector such that the image actually projected by the projector is substantially similar to the image to be projected. In this manner, the projector can be accurately modeled and input images can be modified to be adjusted to project as desired.

Figure 1:
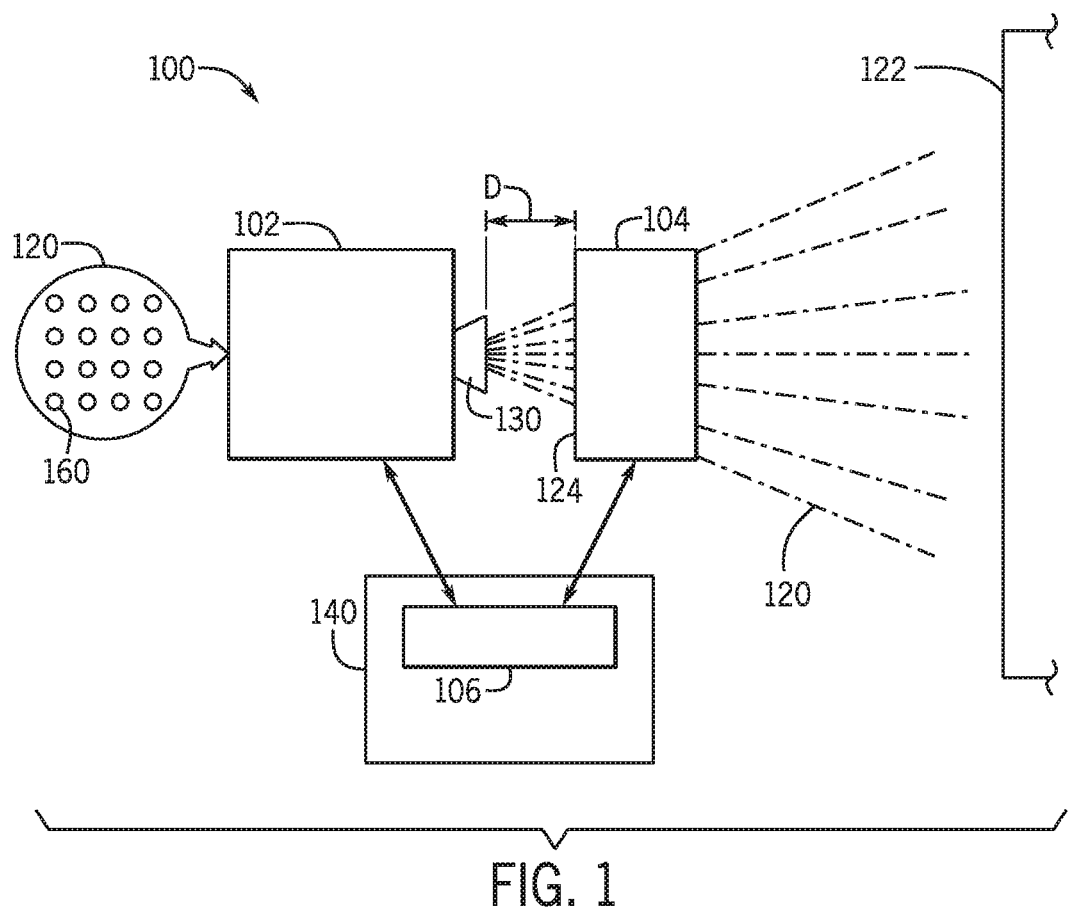
FIG. 1 is a schematic view of a projection calibration system according to the present disclosure.
Figure 2:
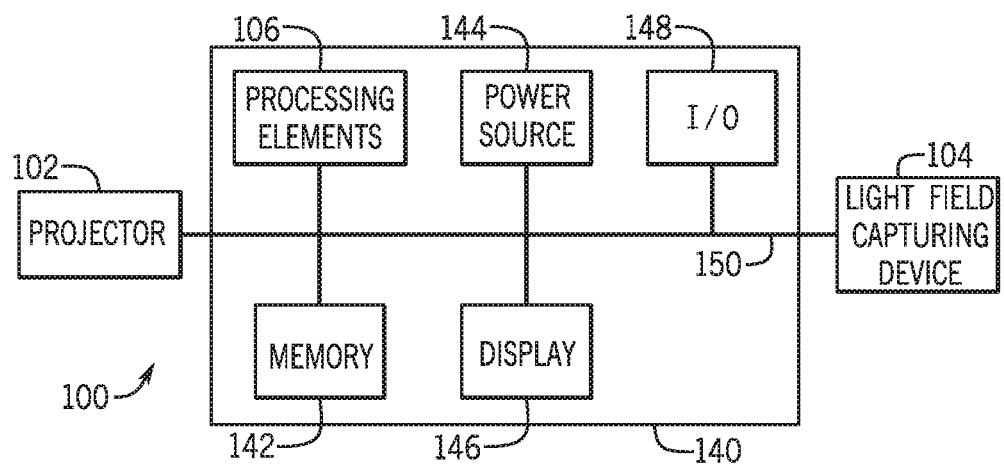
FIG. 2 is a simplified block diagram of the calibration system of FIG. 1.

FIG. 1 a schematic view of a calibration system 100. FIG. 2 is a simplified block diagram of the calibration system 100. Referring to FIGS. 1 and 2, the calibration system 100 may include a projector 102, a light field capturing device 104, and one or more processing elements 106 (such as part of one or more computers or computer systems). The one or more processing elements 106 may be in electrical communication with the light field capturing device 104 either directly or indirectly (e.g., through a data transfer mechanism, wireless connection, or the like). Depending on the particular application, the one or more processing elements 106 may also be in electrical communication with the projector 102. The electrical communication(s) may permit the various elements of the calibration system 100 to share and transport information (e.g., data) between the various elements. For example, the one or more processing elements 106 may receive data (such as light field data, light ray date, or intrinsic properties of the light field capturing device 104, among others, as explained below) from the light field capturing device 104 via the electrical communication between the one or more processing elements 106 and the light field capturing device 104. The one or more processing elements 106 may also transmit data and/or instructions (e.g., commands) to the light field capturing device 104 via the electrical communication between the one or more processing elements 106 and the light field capturing device 104, such as to cause the light field capturing device 104 to begin operation, among others.

Additionally or alternatively, the one or more processing elements 106 may receive data from the projector 102 (such as default parameters of the projector 102, the status of the projector 102, etc.) via the electrical communication between the one or more processing elements 106 and the projector 102. The one or more processing elements 106 may also transmit data and/or instructions (e.g., commands) to the projector 102 via the electrical communication between the one or more processing elements 106 and the projector 102, such as to modify the projection characteristics of the projector 102, as explained below.

The projector 102 may be substantially any type of device operable to emit light into different directions, such as to project an image (such as a still image and/or video images). For example, the projector 102 may be a conventional projector, a laser projector, a cathode ray tube projector, a micro-electro-mechanical projector, a digital light processing projector, a liquid crystal display projector, or a liquid crystal on silicon projector, among others. The projector 102 may be any type of light and may be a lens-based or non-lens based device (e.g., may include one or more mirrors or reflectors). For example, in some embodiments, the projector 102 may project red, green, and/or blue light wavelengths. In some embodiments, the projector 102 may project substantially any other color or frequency of light, including visible and/or invisible light (e.g., ultraviolet, infrared, and others), as necessary. It should be noted that the sensing device should correspond to and be able to detect the type of light being projected. In this manner, the calibration methods and systems discussed herein may be used with substantially any type of projector, and as such, the discussion of any particular embodiment is meant as illustrative only.

In connection with calibrating the projector 102, the projector 102 may be configured to project a test pattern or calibration image 120. As explained below, the calibration image 120 is used to determine the intrinsic properties and/or distortions of the projector 102. For example, by comparing the calibration image 120 with the image and/or light field actually projected by the projector 102, the calibration system 100 can determine the type and degree of internal distortions induced by the projector 102 during the projection process, such as distortions to the projected image caused by the lens distortion, optical axis of the projector, focal length, image filtering hardware and/or software, or the like. As a specific example, the calibration can determine the focal length of the projector, such as the way the light spreads outwards from the projector. Other examples include estimating wavelength dependent distortions, point spread function, or the like. These intrinsic properties or distortions of the projector 102 can then be accounted for in the projection system, such as by applying additional modifications or filters to a source image and/or video signal to cancel out any intrinsic distortions, as provided more fully below.

In some embodiments, the projector 102 may project the calibration image 120 onto a projection surface 122 (see FIG. 1), though such a step is not essential to calibrating the projector 102. Such a step, however, may be beneficial to provide visual indication to the user that distortions exist in the projected image and after calibration, the projector 102 will project the corrected images onto the projection surface 122. The projection surface 122 may be substantially any type of opaque surface or object. For example, the projection surface 122 may be flat, non-planar, or varying, and may include one or more textures, surface variations, or colors. In some instances, the projection surface 122 may include multiple surfaces positioned relative to one another. The type and structure of the projection surface 122 may be varied as desired.

The light field capturing device 104 will now be discussed in more detail. The light field capturing device 104 is any device capable of capturing the light field (and/or any other light emitting properties) of the projector 102. For example, the light field capturing device 104 may be any device capable of acquiring an accurate light field representation of the observed scene. In some embodiments, the light field capturing device 104 may be a light field camera or an image sensor with a light field filter, such as a scanner, among others. The light field capturing device 104 may be used on its own or with one or more filters, screens, or layers that can provide or allow determination of directional data. For example, a screen or filter may be placed in front of the light field capturing device 104, such as on a flatbed scanner. In such embodiments, the screen or filter allows the light field capturing device 104 to acquire the direction of the light emitted from the projector 102. For example, the screen or filter may include a plurality of holes defined therethrough, the holes sized and positioned such that the gathered light includes a measurable directional component. In many embodiments, the light field device should be able to sufficiently estimate (or capture data enabling such estimations) the ray directions for different positions for at least a part of the image plane of the projector.

As described herein, the light field capturing device 104 is configured to capture at least a portion of the calibration image 120 projected by the projector 102. For example, the light field capturing device 104 may include an optical system, such as one or more lenses 124. In some embodiments, the light field capturing device 104 may not include a lens and rather may include lens alternatives such as, but not limited to, shaped mirrors and/or reflectors. The lens 124 of the light field capturing device 104 may be a conventional lens or any other transmissive optical device operable to gather and/or focus light into the light field capturing device 104. In this manner, the light field capturing device 104 captures information about the light field emanating from the projector 102, such as the intensity of light from the projector 102 as well as the direction that light rays 126 are traveling. For example, the light field capturing device 104 may capture the individual spatially varying light rays 126 such that their directions can be estimated by the acquired light field. The light field information captured by the light field capturing device 104 may be converted to light field data and transmitted to the one or more processing elements 106 for analysis and/or storage.

As shown in FIG. 1, the light field capturing device 104 may be positioned relative to the projector 102 (e.g., relative to a projecting lens 130 of the projector 102). For example, the light field capturing device 104 may be spaced from the projecting lens 130 a distance D. Depending on the particular application, the distance D may be a predefined distance or may vary during specific implementation of the calibration system 100. It should be noted that the distance D depends on the setup, the type of projector, light field capturing device, and desired sensitivity for the calibration.

As one example, when using a scanner with a blocking layer having apertures defined therethrough, the distance D should be selected to ensure that the individual rays are captured by singular apertures such that there is not substantial overlap between the apertures. As one particular example that may be used to capture the entire image plane, a flatbed scanner having a blocking layer was used with a mobile projector. In this example, the projector was about 1.5 feet from the scanner and the mask layer or blocking layer was about 0.5 feet from the scanner. However, this distance depends on many factors and may be modified as desired.

The light field capturing device 104 may capture at least a portion (e.g., less than 50%, about 50%, greater than 50%, etc.) of the calibration image 120 for further processing by the one or more processing elements 106. That said, often times, the light field capturing device 104 will capture the entire or substantial portion of the light rays 126 comprising the calibration image 120. For instance, the calibration image 120 may be captured by the light field capturing device 104 from at least one angle such that the whole image plane of the projector 102 is at least sparsely acquired. In some embodiments, only a portion of the image plane of the projector 102 may be acquired. In such embodiments, the calibration system 100 may be configured to estimate the distortions across the entire image plane based on the sparsely acquired data. For instance, distortions occurring at the edges of the projected image may be assumed to exist along each edge of the projected image. Other captured distortions may also be assumed to exist symmetrically across the image plane of the projector 102. In some embodiments, the calibration system 100 may be configured to account for asymmetrical distortions across the image plane. Alternatively or additionally, the light field capturing device may be used to capture multiple images, where each of the images captures a different section of the image plane, such that all images can be analyzed to assess the entire image plane. Or in instances where only a portion of the image plane is of interested, the light field camera may capture only that portion. As shown in FIG. 1, the calibration image 120 may be projected by the projector 102 directly into the lens 124 of the light field capturing device 104, though other suitable configurations are contemplated.

Any number of light field capturing devices 104 may be used. For the sake of simplicity, however, only one light field capturing device 104 is shown in FIG. 1. In embodiments with two or more light field capturing devices 104, the light field capturing devices 104 may be spaced from one another (either at a set distance or at a varying distance). In some embodiments, multiple light field capturing devices 104 may be positioned immediately adjacent one another. In such embodiments, the data captured by the two or more light field capturing devices 104 may be analyzed together by the one or more processing elements 106. Depending on the particular application, the use of two or more light field capturing devices 104 may provide greater accuracy in modeling the intrinsic properties and/or distortions of the projector 102.

With continued reference to FIGS. 1 and 2, the calibration system 100 includes one or more processing elements 106, which may be referred to simply as processors. As noted above, the one or more processing elements 106 analyze data received from the light field capturing device 104 and/or the projector 102. In some embodiments, the one or more processing elements 106 may optionally control one or more functions of the light field capturing device 104 and/or the projector 102. The one or more processing elements 106 may be associated with a computing device 140, such as a computer, a server, a tablet, a smartphone, or any other device capable of processing data. In some embodiments, the one or more processing elements 106 may be part of a computing system defined integrally with the projector 102 or the light field capturing device 104. In other embodiments, the one or more processing elements 106 may be part of a computing system separate from both the projector 102 and the light field capturing device 104 (see FIG. 1).

In the examples of FIGS. 1 and 2, only one computing device 140 is shown; however, any number of computing devices 140 may be used. For the sake of convenience only, the description below will refer to a single computing device 140. Similarly, the description below will refer to a single processing element 106, though any number of processing elements 106 (which may or may not be in direct communication) is contemplated. Where appropriate, the description of the computing device 140 below can be applied to each computing device 140 of the calibration system 100. Similarly, the description of the processing element 106 below can be applied to each processing element 106 of the calibration system 100, where applicable. Thus, reference to "the processing element" may refer to the same processing element 106 or to a different processing element 106 within the calibration system 100.

Referring to FIG. 2, the computing device 140 may include the one or more processing elements 106, one or more memory components 142, a power source 144, a display 146, and an input/output (I/O) interface 148. The computing device 140 may also include other components typically found in computing systems, such as communication interfaces and one or more sensors, among others. Each element of the computing device 140 may be in communication via one or more system buses 150, wirelessly or the like. Each element of the computing device 140 will be discussed in turn below.

The processing element 106 may be substantially any type of electronic device capable of processing, receiving, and/or transmitting instructions. For example, the processing element 106 may be a microprocessor or a microcontroller. Additionally, it should be noted that select components of the computing device 140 may be controlled by a first processing element 106 and other components may be controlled by a second processing element 106, where the first and second processing elements 106 may or may not be in communication with each other. Additionally or alternatively, select calibration steps may be performed by one processing element 106 with other calibration steps performed by different processing elements 106, where the different processing elements 106 may or may not be in communication with each other.

The one or more memory components 142 store electronic data that is used by the computing device 140 to store instructions for the processing element 106, as well as to store presentation and/or calibration data for the calibration system 100. For example, the one or more memory components 142 may store data or content, such as, but not limited to, audio files, video files, and so on, corresponding to various applications. The one or more memory components 142 may be magneto-optical storage, read only memory, random access memory, erasable programmable memory, flash memory, or a combination of one or more types of memory components.

The power source 144 provides power to the components of the computing device 140. Depending on the particular application, the power source 144 may be a battery, a power cord, or any other element configured to transmit electrical power to the components of the computing device 140.

The display 146 provides visual feedback to a user. In some embodiments, the display 146 can act as an input element (e.g., a touch screen display) to enable a user to control, manipulate, and calibrate various components of the calibration system 100. The display 146 may be any suitable display, such as a liquid crystal display, a plasma display, an organic light emitting diode display, and/or a cathode ray tube display. In embodiments where the display 146 is used an input, the display 146 may include one or more touch or input sensors, such as one or more capacitive touch sensors, a resistive grid, or the like.

The I/O interface 148 provides communication to and from the computing device 140, such as to or from the light field capturing device 104, the projector 102, or any other device (e.g., other computing devices, auxiliary scene lighting, auxiliary sensors, speakers, etc.). The I/O interface 148 may include one or more input buttons, a communication interface (such as WiFi, Ethernet, Bluetooth, or the like), communication components (such as universal serial bus (USB) ports/cables), or the like.

Figure 3:
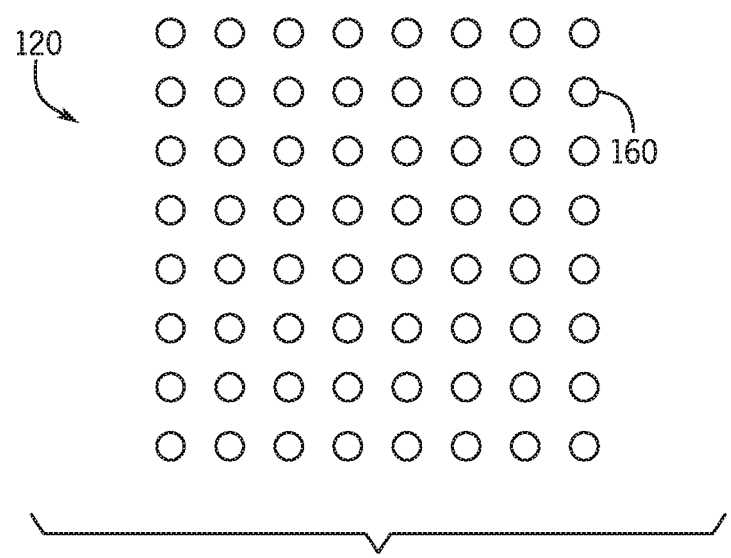
FIG. 3 illustrates an example calibration pattern or image for use in calibrating the projection system of FIG. 1.

FIG. 3 illustrates an example calibration pattern or image for use in calibrating the projection system. As part of the calibration process, the projector 102 projects the calibration image 120 directly into the light field capturing device 104, such as directly into the lens 124 of the light field capturing device 104. In particular, the light field capturing device 104 captures the projected light directly from the projector 102, as opposed to capturing reflected light off of an intermediate surface, such as off of the projection surface 122. In this manner, the light field capturing device 104 may capture the light emitted from the projector 102 without interfering elements or surfaces. For example, the light field capturing device 104 may capture the photons of light emitted by the projector 102 without the photons being reflected or otherwise modified. As such, the light field capturing device 104 may capture the calibration image 120 projected by the projector 102 without the need of a projection surface altogether. In instances where the light field capturing device includes a blocking layer, the light that reaches the light field capturing device is not distorted, but the percentage of light reaching the device may be reduced to a fraction of the overall light.

The calibration image 120 may be a predefined, structural light arrangement having one or more pattern elements 160. For example, the calibration image 120 may include one or more regions with substantially constant properties, or properties that are varied, within a prescribed range of values. The pattern elements 160 may be similar to, or dissimilar from, each other in at least one characteristic. The calibration image 120 may be constructed in such a way that the location of each pattern element 160 may provide identifying information. For instance, each pattern element 160 may include an identifier associate therewith that can be explicitly displayed and/or implicitly deduced.

As shown in FIG. 3, the pattern elements 160 may be an array of dots or other shapes. Depending on the particular embodiment, the pattern elements 160 may be in the shape of a circle, a plus sign, a square, or other suitable geometric shape. The pattern elements 160 may also include localized or structured changes in variations in color, hue, intensity, polarization, or tint, where these characteristics may provide additional data points to be tracked or may form the pattern elements 160 themselves. The pattern elements 160 may be arranged in rows and columns, either symmetrically or asymmetrically. Additionally or alternatively, the pattern elements 160 may be distributed in a structured uniform or non-uniform manner. For example, as shown in FIG. 3, the pattern elements 160 may be arranged such that each pattern element 160 is positioned equidistant to adjacent pattern elements 160. The number of pattern elements 160 may be varied based on the desired accuracy for the calibration. For example, increasing the number of pattern elements 160 may increase the sensitivity and/or accuracy of the calibration, and vice versa. FIG. 3 illustrates one exemplary embodiment, and any other pattern with different arrangement characteristics or features may be used. As such, the discussion of any particular embodiment is meant to be illustrative only.

Figure 4:
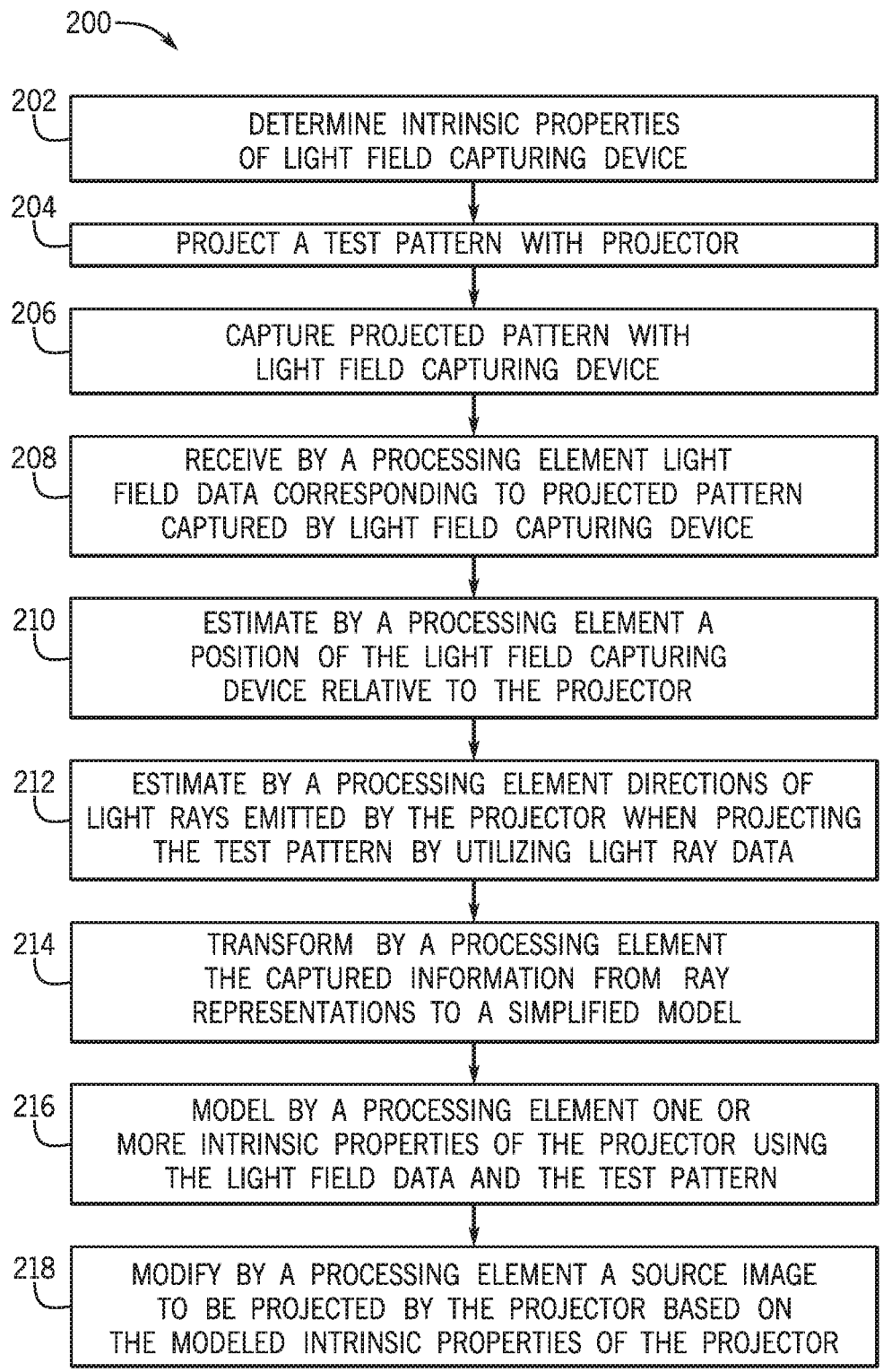
FIG. 4 is a flow chart illustrating a method of calibrating a projection system.

FIG. 4 is a flow chart illustrating a method 200 for calibrating a projection system, such as the projector 102. Referring to FIG. 4, the method 200 may begin with determining the intrinsic properties of the light field capturing device 104 (Block 202). Determining the intrinsic properties of the light field capturing device 104 may include acquiring the properties either through vendor information (via web or print media), directly from the light field capturing device 104 itself, or through calibration methods (such as well-known light field camera calibration methods). For example, the intrinsic properties of the light field capturing device 104 may be provided by the manufacturer and stored directly on the light field capturing device 104. In such embodiments, the intrinsic properties of the light field capturing device 104 may be acquired by the computing device 140 once electrical communication is made between the computing device 140 and the light field capturing device 104. In other embodiments, the user may enter the intrinsic properties of the light field capturing device 104 into the computing device 140 after acquiring such information in available web or print media (e.g., online or print owner's manuals, etc.). The user may also enter generally acceptable properties that may cover a wide range of light field capturing devices. The intrinsic properties of the light field capturing device 104 may be stored on the computing device 140 (e.g., on the one or more memory components 142 and/or on the one or more processing elements 106, etc.) for use in calibrating the projector 102, as detailed below.

In some embodiments, the method 200 may include projecting a test pattern, such as the calibration image 120, by the projector 102 (Block 204). As noted above, the projector 102 may be operable to project the calibration image 120 directly into the lens 124 of the light field capturing device 104. For instance, as explained above, the projector 102 may emit photons of light unobstructedly into the lens 124 of the light field capturing device 104 (i.e., without an intermediate surface positioned therebetween). More particularly, a straight light path may extend from the projector 102 to the lens 124 of the light field capturing device 104 absent an intermediate image formation, such as on a surface.

In any case, the method 200 may include capturing the calibration image 120 by the light field capturing device 104 (Block 206). In such embodiments, the light field capturing device 104 captures the projected light making up the captured calibration image 120 into light field data corresponding to the calibration image 120. The light field data may include the intensity of light from the projector 102 as well as the direction that the light rays 126 are traveling from the projector 102 to the light field capturing device 104.

With continued reference to FIG. 4, the method 200 includes receiving by the processing element 106 the light field data corresponding to the calibration image 120 captured by the light field capturing device 104 (Block 208). As noted above, the light field data may be communicated to the processing element 106 via electrical communication between the light field capturing device 104 and the computing device 140. Depending on the particular application, the computing device 140 may be hardwired to the light field capturing device 104. In some embodiments, the computing device 140 may be selectively connected to the light field capturing device 104, such as via a communication cable (e.g., a USB cable, a mini USB cable, or the like), via a communication device (e.g., memory chip), and/or via wireless communication protocols (e.g., WiFi, Bluetooth, etc.).

As shown in FIG. 4, the method 200 may include estimating by the processing element 106 a position of the light field capturing device 104 relative to the projector 102 using the calibration image 120 (Block 210). For example, based on the light field data received from the light field capturing device 104 as well as the intrinsic properties of the light field capturing device 104, the processing element 106 may estimate the distance D of the light field capturing device 104 from the projector 102. For example, a lower angle of incidence of the light ray directions captured by the light field capturing device 104 may indicate a smaller distance D. In like manner, a higher angle of incidence of the light ray directions captured by the light field capturing device 104 may indicate a larger distance D. In like manner, differing angles of incidence associated with opposing sides of the captured calibration image 120 may indicate that the light field capturing device 104 is positioned at a nonparallel angle to the image plane of the projector 102.

In some embodiments, the method 200 may include estimating, by the processing element 106, directions of light rays 126 emitted by the projector 102 when projecting the calibration image 120 by utilizing light ray data (Block 212). For example, using the position of the light field capturing device 104 estimated in Block 210, the processing element 106 can analyze the light ray angles of incidence to estimate the directions of the light rays 126 being emitted by the projector 102 in projecting the calibration image 120. In this manner, the processing element 106 can estimate or model what the projected image will look like on a projection surface, such as on the projected surface 122. Depending on the particular application, the method 200 may include transforming by the processing element 106 the captured information from ray representations to a simplified model (Block 214). For example, the processing element 106 may transform the captured information from ray representations to a pinhole model, though other suitable simplified models are contemplated.

With continued reference to FIG. 4, the method 200 includes modeling by the processing element 106 one or more intrinsic properties of the projector 102 using the light field data and the calibration image 120 (Block 216). In one embodiment, the processing element 106 may analyze the light field data to detect the location of the pattern elements 160 using an image analysis algorithm that can detect the locations of the pattern elements 160. As some examples, image processor operators, such as blob detection and center of gravity estimation, line detection, structured light processing using binary gray codes, or the like can be used. In short, substantially any method that generates mapping from the light field capturing device image plane to the image plane of the projector can be used. When the light field capturing device is a light field camera, this analysis can provide the ray direction information directly. When the light field capturing device is a scanner with a blocking layer, the directionality of the light may be estimated during the calibration process.

Using the image analysis above, the processing element 106 may review the captured projected image against the calibration image 120 to detect regions that differ in one or more properties, such as, but not limited to, brightness, color, hue, and position. For example, depending on the intrinsic properties and/or distortions of the projector 102, the pattern elements 160 captured by the light field capturing device 104 may have a different color, brightness, and/or position compared to the calibration image 120. Once the captured pattern elements 160 have been detected and compared against the calibration image 120, the processing element 106 may model the intrinsic properties of the projector 102. For example, using the light field data and the calibration image 120, the processing element 106 can model the distortions to the projected image caused by the projector's lens, the projector's image filtering systems, or the like.

Continuing to refer to FIG. 4, the method 200 may include modifying by the processing element 106 a source image to be projected by the projector 102 based on the modeled intrinsic properties of the projector 102 (Block 218). For example, based on the modeled intrinsic properties/distortions of the projector 102, the processing element 106 may modify or otherwise alter an input signal to the projector 102 such that the image actually projected substantially matches the image to be projected. For example, and without limitation, the processing element 106 may modify the input signal to brighten areas that are otherwise darkened to the intrinsic properties of the projector 102. In like manner, the processing element 106 may modify the input signal to move portions of a projected image that would otherwise be skewed due to the intrinsic properties of the projector 102.

The method 200 disclosed herein may be used in various situations. For example, the intrinsic properties and/or distortions of the projector 102 may be canceled out or otherwise accounted for such that the image actually projected by the projector 102 appears as close to the image to be projected. In other examples, a first type, model, or serial number of projector may include a first set of intrinsic properties and/or distortions affecting the projected image in a first manner. A second type, model, or serial number of projector may include a second set of intrinsic properties and/or distortions affecting the projected image in a second manner. In such examples, the method 200 disclosed herein can model (and account) for the varying intrinsic properties/distortions and/or wavelength dependent issues between the two projectors such that the images actually projected by the first and second projectors appear substantially similar.

The above specifications, examples, and data provide a complete description of the structure and use of exemplary embodiments of the invention as defined in the claims. Although various embodiments of the disclosure have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:

1. A method of calibrating a projector, the method comprising:
   receiving by a processing element light field data corresponding to a calibration image captured by a light field capturing device, wherein the calibration image is projected by a projector directly into a light field capturing device;

estimating by the processing element directions of light rays emitted by the projector when projecting the calibration image by utilizing light ray data; and modeling by a processing element one or more intrinsic properties of the projector using the light field data and the calibration image.

2. The method of claim 1, further comprising estimating by the processing element a position of the light field capturing device relative to the projector using the calibration image.

3. The method of claim 1, further comprising transforming by the processing element the captured information from ray representations to a simplified model.

4. The method of claim 3, wherein the captured information is transformed from ray representations to a pinhole model.

5. The method of claim 3, further comprising modifying by a processing element a source image to be projected by the projector based on the modeled intrinsic properties of the projector.

6. The method of claim 1, wherein the calibration image is captured by the light field capturing device from at least one angle such that the whole image plane of the projector is at least sparsely acquired.

7. The method of claim 1, wherein the calibration image is projected by the projector onto a projection surface.

8. The method of claim 1, further comprising determining the intrinsic properties of the light field capturing device.

9. A system for calibrating a projector, the system comprising:

a projector configured to project a calibration image;

a light field capturing device configured to capture at least a portion of the calibration image projected by the projector, wherein light rays making up the calibration image are projected into the light field capturing device without reflecting on an intermediate surface; and a processing element in communication with the light field capturing device, wherein the processing element is configured to:

estimate directions of light rays emitted by the projector when projecting the calibration image by utilizing ray data;

transform the ray representations to a simplified model; and model one or more intrinsic properties of the projector using light field data corresponding to the calibration image captured by the light field capturing device.

10. The system of claim 9, wherein the processing element is further configured to estimate a position of the light field capturing device relative to the projector using the light field data captured by the light field capturing device.

11. The system of claim 10, wherein the simplified model is a pinhole model.

12. The system of claim 9, wherein the processing element is part of a computing system separate from the projector and the light field capturing device.

13. The system of claim 9, wherein the processing element is part of a computing system defined as part of the projector or the light field capturing device.

14. The system of claim 9, wherein the light field capturing device is a light field camera or a scanner.

15. The system of claim 2, wherein estimating by the processing element directions of light rays emitted by the projector comprises:

analyzing angles of incidence of the light rays at the capturing device and the position of the light field capturing device relative to the projector to estimate the directions of the light rays.

16. The system of claim 10, wherein the position of the light field capturing device and incident angles of light rays at the light field capturing device are used to estimate the directions of the light rays emitted by the projector when projecting the calibration image.

* * * * *